United States Patent
Wang et al.

(10) Patent No.: US 7,844,434 B2
(45) Date of Patent: Nov. 30, 2010

(54) SYSTEM AND METHODS FOR IMPLEMENTING A NON-LINEAR ELECTRICAL CIRCUIT DYNAMIC FUEL CELL MODEL

(75) Inventors: Yang Wang, Tallahassee, FL (US); Jian-ping Zheng, Tallahasssee, FL (US)

(73) Assignee: Florida State University Research Foundation, Inc., Tallahassee, FL (US)

(*) Notice: Subject to any disclaimer, the term of this patent is extended or adjusted under 35 U.S.C. 154(b) by 732 days.

(21) Appl. No.: 11/761,077

(22) Filed: Jun. 11, 2007

(65) Prior Publication Data

US 2007/0288126 A1  Dec. 13, 2007

Related U.S. Application Data

(60) Provisional application No. 60/804,367, filed on Jun. 9, 2006.

(51) Int. Cl.
*G06F 17/50* (2006.01)
(52) U.S. Cl. .......................................................... 703/13

(58) Field of Classification Search ................... 703/13; 429/12, 22
See application file for complete search history.

(56) References Cited

U.S. PATENT DOCUMENTS

| 6,519,554 | B1* | 2/2003 | Gieseke et al. | 703/6 |
| 2002/0120906 | A1* | 8/2002 | Xia et al. | 716/2 |
| 2005/0091023 | A1* | 4/2005 | Fujiuchi et al. | 703/13 |

* cited by examiner

*Primary Examiner*—David Silver
(74) *Attorney, Agent, or Firm*—Novak Druce + Quigg

(57) ABSTRACT

A nonlinear electrical circuit dynamic model for different fuel cells is provided. The model provides a nonlinear electrical circuit equivalent, the parameters of which correspond to the particular fuel cell being modeled. The parameters can be theoretically or experimentally derived from the responses of the particular fuel cell. The resulting model can have impedances that are equivalent to that of the particular fuel cell, thereby capturing or providing a good approximation of the transient behavior of the particular fuel cell. More particularly, the resulting model can have impedances in the low frequency range less than 100 Hz that are equivalent to that of the particular fuel cell.

8 Claims, 8 Drawing Sheets

US 7,844,434 B2

SYSTEM AND METHODS FOR IMPLEMENTING A NON-LINEAR ELECTRICAL CIRCUIT DYNAMIC FUEL CELL MODEL

CROSS REFERENCE TO RELATED APPLICATION

The present application claims the priority of U.S. provisional patent application No. 60/804,367, titled SYSTEM AND METHODS FOR IMPLEMENTING A NON-LINEAR ELECTRICAL CIRCUIT DYNAMIC FUEL CELL MODEL, filed Jun. 9, 2006. The aforementioned related application is incorporated herein by reference in its entirety.

FIELD OF THE INVENTION

The present invention is related to the field of fuel-cell-based power generation, and, more particularly, to the implementation of models for analyzing and designing electrical circuits having fuel cell components.

BACKGROUND OF THE INVENTION

A fuel cell is an electrochemical device that converts chemical energy, derived from a fuel, into electrical energy. The use of different types and designs of fuel cells is expected by many observers to increase dramatically in the future as fuel cells are employed as mobile and stationary power sources for powering an ever-expanding array of devices. Accordingly, there is heightened interest in techniques for accurately and efficiently modeling the operative behavior of different types and designs of fuel cells.

The operative responses of a fuel cell typically depend on a number of different factors, such at the fuel and oxidant feed, flow, and pressure, as well as temperature within the fuel cell. An important objective in modeling a fuel cell is to capture the transient behavior of the fuel cell associated with various factors such as flow and inertia dynamics and reactant partial pressures.

Presently, two general classes of dynamic fuel cell models are widely employed. One type of dynamic fuel cell model is the empirical-based model of a fuel cell. Empirical-based models are typically modified versions of a steady-state model in which a capacitive element is incorporated in order to describe transient response properties of the fuel cell being modeled. Such models are usually combined with so-called lumped electrical circuit elements whose internal physical properties are largely suppressed in favor of an overall terminal description.

Empirical-based models offer an advantage in so far as the parameters associated with the electrical circuit elements are usually easy to obtain from experimental data derived from the operation of the particular fuel cell being modeled. These models are limited, however, in that most can not be used to model important transient phenomena such as voltage overshooting and undershooting of the fuel cell.

The other general class of dynamic fuel cell models comprise mathematical-based models. These models typically comprise a number of time-based partial differential equations derived from the electrochemical, electronic, mechanical, thermal, and other theoretical properties of the fuel cell being modeled. The mathematical-based models are generally capable of modeling transient response properties stemming from the intrinsic physical characteristics of a fuel cell. Such models, however, are typically very complex, thus requiring considerable calculation to adequately model a particular fuel cell. Moreover, at least some of the parameters associated with the different equations of such a model can be very difficult to determine.

It follows that there is a need for a more effective and efficient technique for modeling a fuel cell and fuel stack systems. Specifically, there is a need for a dynamic fuel cell model that captures the transient behavior of the fuel cell while mitigating the computational demands imposed by elaborate and complex mathematical equations.

SUMMARY OF THE INVENTION

The present invention provides a nonlinear electrical circuit dynamic model for different fuel cells. The model provides a nonlinear electrical circuit equivalent, the parameters of which correspond to the particular fuel cell being modeled. The parameters can be mathematically derived from the impedance fuel cell models mapped from the impedance spectra of the target fuel cell. The resulting model can have impedances that are similar or equivalent to that of the target fuel cell, thereby capturing or providing a good approximation of the transient behavior of the target fuel cell. More particularly, the resulting model can have impedances in the low frequency range less than 100 Hz that are equivalent to that of the particular fuel cell.

One of the various applications of the nonlinear electrical circuit dynamic model provided by the invention is as an electric circuit model that can be used to characterize the electrical properties of a fuel cell. The electrical properties so characterized can be provided in data sheets distributed by a manufacturer of a particular fuel cell.

In other applications of the nonlinear electrical circuit dynamic model is utilized in a fuel cell controller, software fuel cell simulation module, hardware fuel cell simulator, DC-DC converter, or DC-AC inverter. The nonlinear electrical circuit dynamic model can be used to predict or simulate the output of the fuel cell given certain inputs and other operating conditions. The optimum operating conditions related to certain inputs of the fuel cell also can be calculated using the nonlinear electrical circuit dynamic model. The optimum operating conditions, once determined, can be fed into the fuel cell or other power system in which the fuel cell is incorporated so as to obtain the optimum output of the fuel cell or other power system. As part of a fuel-cell-based power system, the nonlinear electrical circuit dynamic model of the invention can improve the response efficiency while also simplifying the control strategy of the power system that incorporates a particular fuel cell modeled according to the invention.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION

Figure 1A:
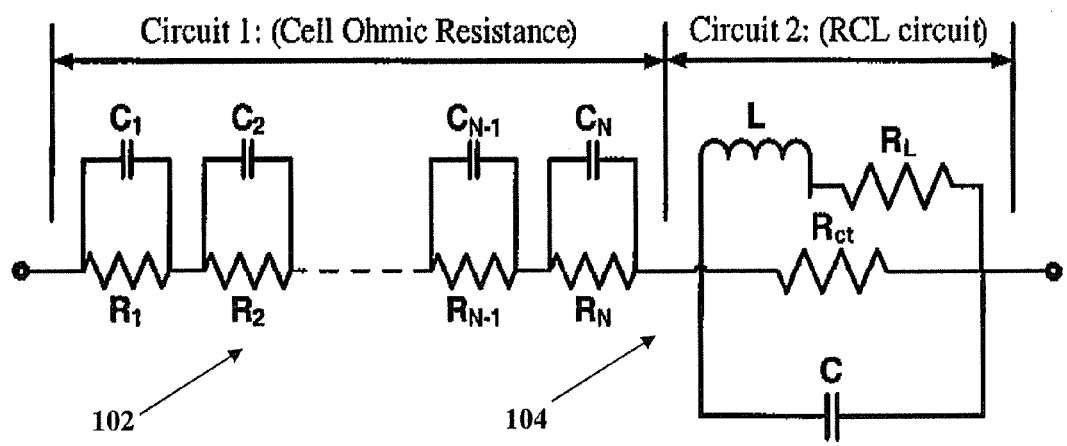
FIGS. 1A and 1B are schematic diagrams, respectively, of a nonlinear electrical circuit equivalent of a fuel cell and a transmission line model of a fuel cell, according to two distinct embodiments of the invention.

FIG. 1A schematically illustrates a circuit equivalent 100 of an arbitrary fuel cell, according to one embodiment of the invention. The circuit comprises linear and/or nonlinear electrical circuit elements, the parameters of which correspond to the Nonlinear Electrical Circuit Dynamic Fuel Cell (NECDFC) model described herein. As further described herein, the NECDFC model has impedances that are approximately equal to that of the particular fuel cell modeled by the NECDFC model. Accordingly, the dynamic responses of the NECDFC model and the corresponding fuel cell can exhibit the same or similar transient behaviors. It follows, moreover, that the NECDFC model can accurately characterize the electrical properties of a fuel cell or fuel cell stack modeled using the NECDFC model.

Referring still to FIG. 1A, the illustrated circuit equivalent underlying the NECDFC model includes two distinct circuits. The first circuit 102 corresponds to cell ohmic resistance and models the ohmic loss of a particular fuel cell according to the following performance equation:

$$V = V_0 - A \cdot \ln(i) - iR_0. \quad \text{EQ 1}$$

Equation 1 specifies a mathematical relation between the voltage of the fuel cell, termed the cell voltage, V. The first term on the right-hand side of Equation 1, $V_0$, is the reversible open circuit voltage of the cell. The second term is an activation loss term, or Tafel term. As will be understood by those of ordinary skill in the art, A is the Tafel parameter of oxygen reduction that occurs within the fuel cell. The second term is the product of the Tafel parameter times the natural log of the cell current, i. The third term is the ohmic loss term, which is the product of the cell current i times the cell ohmic resistance, $R_0$.

More generally, the performance equation is:

$$V = V_0 - A \cdot \ln(i) - iR_0 - V_{con} \quad \text{EQ 1'}$$

where the last term on the right-hand side of Equation 1' is the concentration voltage loss, the other terms being defined as in Equation 1. The total resistance of the first circuit 102 is equal to the sum of the cell ohmic resistance $R_0$, which is due primarily to the resistance of the membrane electrode assembly and the contact resistance of the fuel cell, and the equivalent resistance of $V_{con}/i$. If $V_{con}/i$ is sufficiently small, or $V_{con}$ is approximately constant, in the activation loss and ohmic loss regions, then the total resistance of the first circuit is approximately equal to the cell ohmic resistance $R_0$. Under these conditions, the physical properties of the nonlinear first circuit 102 can be modeled by a linear equation. Accordingly, Equation 1 can be used in lieu of Equation 1', the former providing a good approximation of the latter.

The first circuit 102 is therefore a linear electrical circuit. Illustratively, the first circuit 102 comprises a plurality of n resistor-capacitor loops connected in series, each loop comprising a resistor $R_k$ and capacitor $C_k$, k=1, ..., n, connected in parallel. In the steady-state, the total resistance of the first circuit 102 is defined to be equal to the cell ohmic resistance, $R_0$. The contribution of the resistor-capacitor loops of the first circuit 102 to the transient phenomena of a particular fuel cell being modeled, as compared to the second circuit 104, can be ignored if the cut-off frequencies of the resistor-capacitor loops are, for example, greater than 100 Hz, according to certain experimental results. Under such conditions, the circuit can be simplified by replacing the resistor-capacitor loops with a single resistor having a resistance equal to the cell ohmic resistance of the fuel cell being modeled. Thus, in other embodiments, the first circuit 102 can comprise a single resistor or, alternatively, a plurality of resistors whose equivalent resistance is equal to the cell ohmic resistance $R_0$ of the fuel cell being modeled.

The second circuit of the model circuit equivalent 100 is a nonlinear circuit. Illustratively, the second circuit is an RCL circuit 104 that illustratively comprises two nonlinear resistors $R_L$ and $R_{CT}$, one linear or nonlinear capacitor C, and one nonlinear inductor L. The total resistance of the RCL circuit 104 is defined such that, in a steady-state condition, the total resistance of the circuit is approximately equal to the second term of Equation 1; that is, $A \cdot \ln(i)$.

According to the invention, the nonlinear elements of the RCL circuit 104 are mathematically defined by the following set of equations:

$$R_{CT}(i_{CT}) = A_{CT} \cdot \ln(\alpha_{CT} i_{CT})/(\alpha_{CT} i_{CT}) \quad \text{EQ 2}$$

$$R_L(i_L) = A_L \cdot \ln(\alpha_L i_L)/(\alpha_L i_L) \quad \text{EQ 3}$$

$$L(i_L) = B_L \cdot \ln(\alpha_L i_L)/(\alpha_L i_L) \quad \text{EQ 4}$$

$$C = C_0 \quad \text{EQ 5}$$

where $A_k$, $B_k$, and $\alpha_k$, k=CT, L, are constant parameters. Note that, as defined in Equation 5, the capacitor in the RCL circuit 104 is assumed to be a linear element having a constant capacitance, $C_0$.

More generally, the expressions of the nonlinear elements of the RCL circuit 104 defined as follows:

$$R_{CT}(i_{CT}) = R_{CT}^0 + A_{CT} \cdot \ln(\alpha_{CT} i_{CT})/(\alpha_{CT} i_{CT}) \quad \text{EQ 2'}$$

$$R_L(i_L) = R_L^0 + A_L \cdot \ln(\alpha_L i_L)/(\alpha_L i_L) \quad \text{EQ 3'}$$

$$L(i_L) = L^0 + B_L \cdot \ln(\alpha_L i_L)/(\alpha_L i_L) \quad \text{EQ 4'}$$

$$C = C_0 + B_C \cdot \ln(\alpha_C i_C)/(\alpha_C i_C) \quad \text{EQ 5'}$$

where, again, where $A_k$, $B_k$, and $\alpha_k$, k=CT, L, are constant parameters. $R_{CT}^0$, $R_L^0$, $L^0$, and $C_0$ are also constant parameters. $R_{CT}^0$ and $R_L^0$ are the parameters related to concentration loss and thus are typically negligible. $L^0$ and $C_0$ are based on the particular fuel cell being modeled by the NECDFC model. If the terms are negligible, the terms can be ignored. Accordingly, Equations 1-5 can provide a good approximation and can be used in lieu of Equations 1'-5'.

Equations 2'-5' represent one set of solutions. The set of solutions, however, can be generalized as follows:

$$R_{CT}(i_{CT}) = R_{CT}{}^0 + A_{CT} \cdot \ln(\alpha_{CT} \cdot i_{CT})/(\alpha_{CT} \cdot i_{CT}) \qquad \text{EQ 2''}$$

$$R_L(i_L) = R_L{}^0 + A_L \cdot \ln(\alpha_L \cdot i_L)/(\alpha_L \cdot i_L) \qquad \text{EQ 3''}$$

$$L(i_L) = L^0 + B_L \cdot \ln(\beta_L \cdot i_L)/(\beta_L \cdot i_L) \qquad \text{EQ 4''}$$

$$C = C_0 + B_C \cdot \ln(\alpha_C \cdot i_C)/(\alpha_C \cdot i_C) \qquad \text{EQ 5''}$$

where the constant parameters are $A_k$, $B_k$, $\alpha_k$, $\beta_k$, k=CT, L. Thus, Equations 2'-5' represent the special case in which $\alpha_k = \beta_k$. The generalized set of solutions is provided by Equations 2''-5''.

The parameters of the NECDFC model of the invention are constant values of the variables of the current through and/or the voltage across the circuit elements. However, these parameters can be and should be treated as functions of other variables, including, for example, cell temperature, fuel concentration, gas flux, and other relevant variables corresponding to the fuel cell being modeled.

According to the invention, the equivalent circuit 100 underlying the NECDFC model can be mathematically described by a set of differential equations derived on the basis of known principles of electrical circuit theory. When the resistor-capacitor loops can be approximated by a single resistor having a cell ohmic resistance of $R_0$, a mathematical description of the NECDFC model equivalent circuit 100, based on the approximation, is $$V = V_0 - R_0 I - V_{RCL} \qquad \text{EQ 6}$$

$$V_{RCL} = R_{CT}(i_{CT}) \cdot i_{CT} \qquad \text{EQ 7}$$

$$i_c = \frac{dq_c}{dt} \qquad \text{EQ 8}$$
$$= \frac{d}{dt}(C \cdot V_{RCL})$$
$$= \left[C(V_{RCL}) + V_{RCL} \cdot \frac{\partial C(V_{RCL})}{\partial V_{RCL}}\right] \cdot \left(\frac{dV_{RCL}}{dt}\right)$$

$$V_{RCL} = R_L(i_L) \cdot i_L + \frac{d}{dt}[L(i_L) i_L] \qquad \text{EQ 9}$$
$$= R_L(i_L) \cdot i_L + R_L'(i_L) \cdot i_L +$$
$$\left[L(i_L) + i_L \frac{\partial L(i_L)}{\partial i_L}\right]\left(\frac{di_L}{dt}\right)$$

$$I = i_{CT} + i_c + i_L \qquad \text{EQ 10}$$

where $V_0$ and $R_0$ are both defined as above in the context of Equation 1. V and I are the voltage and current, respectively, of the particular fuel cell being modeled according to the NECDFC model. $V_{RCL}$ represents the voltage drop across the RCL circuit 104. The terms $i_{CT}$, $i_C$, and $i_L$ are the currents via charge transfer through the resistor $R_{CT}$, capacitor C, and the inductor L, respectively. The term $q_c$ represents the charge stored by the capacitor.

Each of the constant parameters of the NECDFC model can be mathematically derived from a special group of impedance fuel cell models of the particular fuel cell to be modeled or mapped from the polarization curve of the fuel cell operating in the steady-state condition. The impedance fuel cell models can be mapped from the empirical or theoretical impedance spectra of the particular fuel cell. The polarization curve can also obtained from theoretical or empirical results.

In a steady-state condition, the total resistance of the RCL circuit 104, based on Ohm's law, is $$R_{Sum}(I^0) = R_{CT}(i_{CT}{}^0) \cdot R_L(i_L{}^0)/[R_{CT}(i_{CT}{}^0) + R_L(i_L{}^0)] \qquad \text{EQ 11}$$

The determined values $I^0$, $i_{CT}{}^0$, and $i_L{}^0$ are steady-state values. The voltage drop across the circuit can be assumed equal to the activation of the fuel cell (e.g., a direct-methanol fuel cell, DMFC, in which the fuel is methanol ($CH_3OH$) in either a gaseous or liquid state). From Equation 1, the activation loss of the fuel cell corresponds to the Tafel term:

$$V_{Activ} = A \cdot \ln(I^0) \qquad \text{EQ 12}$$

Therefore, the parameters in Equations 2-12 have the following mathematical relations:

$$A = [A_{CT} \cdot A_L/(A_{CT} + A_L)] \qquad \text{EQ 13}$$

$$I^0 = \alpha_L \cdot i_L{}^0 = \alpha_{CT} \cdot i_{CT}{}^0 \qquad \text{EQ 14}$$

$$\alpha_L = (A_{CT} + A_L)/A_{CT} \qquad \text{EQ 15}$$

$$\alpha_{CT} = (A_{CT} + A_L)/A_L \qquad \text{EQ 16}$$

As implied by the equations, among the five parameters A, $A_{CT}$, $A_L$, $\alpha_{CT}$, and $\alpha_L$, only two of the parameters can be independent. Therefore, by finding two of the parameters' values, the corresponding values for each of the remaining three can be determined according to Equations 13-16. The parameters $V_0$, $R_0$, and A can be obtained by fitting the polarization curve to the performance equation, Equation 1.

Another method for determining constant parameters of the NECDFC model comprises determining electrochemical impedance spectra using known methods of electrochemical impedance spectroscopy. Electrochemical impedance spectroscopy is a robust process for characterizing many of the electrical properties of materials and material interfaces. The procedure is based on small-signal approximations in which an input variable consists of a steady-state term and an alternating term. An alternating term is treated as a small perturbation and approximated by linearization.

The small-signal approximation, however, typically impedes the direct use of electrochemical impedance spectroscopy for analyzing or optimizing the nonlinearity of a fuel cell or fuel-cell-based system in order to model their dynamic behavior. In order to overcome this impediment, electrochemical impedance spectra of a particular fuel cell are measured point-to-point along the polarized cure of the fuel cell. Values of the electrical elements of the RCL circuit, as mapped from the electrochemical impedance spectra, are plotted against the steady-state cell current and/or cell voltage. The process yields curves showing the values of the electrical elements corresponding the levels of state-state cell current and/or cell voltage. By known quantitative methods of curve fitting, the resulting curves are fitted to the constant parameters in Equations 2-5.

Linearized differential equations are obtained based upon the small-signal approximations to Equations 6-10 using the steady-state solutions, $V_{RCL}{}^0$, $I^0$, $i^0 = 0$, $i_{CT}{}^0$, and $i_L{}^0$:

$$\Delta V = -R_0 \Delta I - \Delta V_{RCL} \qquad \text{EQ 17}$$

$$\Delta V_{RCL} = \left[R_{CT}(i_{CT}) + \frac{\partial R_{CT}(i_{CT})}{\partial i_{CT}}\right]\bigg|_{i_{CT} = i_{CT}^0} \cdot \Delta i_{CT} \qquad \text{EQ 18}$$
$$= R'_{CT} \cdot \Delta i_{CT}$$

-continued $$\Delta i_c = \frac{d\Delta q_c}{dt} \quad \text{EQ 19}$$

$$= C \cdot \frac{d}{dt}(\Delta V_{RCL})$$

$$\Delta V_{RCL} = \left[R_L(i_L) + i_L \frac{\partial R_L(i_L)}{\partial i_L}\right]\bigg|_{i_L=i_L^0} \cdot \Delta i_L + \quad \text{EQ 20}$$

$$\left[L(i_L) + i_L \frac{\partial R_L(i_L)}{\partial i_L}\right]\bigg|_{i_L=i_L^0} \cdot \left(\frac{d\Delta i_L}{dt}\right)$$

$$= R_L' \cdot \Delta i_L + L \cdot \left(\frac{d\Delta i_L}{dt}\right)$$

$$\Delta I = \Delta i_{CT} + \Delta i_c + \Delta i_L \quad \text{EQ 21}$$

where $R_{CT}'$, $R_L'$, and $L'$ are constants related to the linear circuit elements; C is assumed to be a constant capacitor in equation 19. These constants are in fact pseudo electrical elements, corresponding to the actual electrical circuit elements in the differential equations. Equations 17-21 are transformed into linear algebraic equations by applying Fourier transforms. Through this process, a linearized impedance spectrum of the nonlinear RCL circuit is obtained. The contribution of each of the parameters corresponding to the nonlinear components represented in Equations 17-21 to the pseudo electrical elements can be characterized by an equation having the following general form:

$$A' = \left[A(x) + \frac{dA(x)}{dx} \cdot x\right]\bigg|_{x=x^0}, \quad \text{EQ 22}$$

where $A(x)$ generally represents the nonlinear parameters $R_{CT}(i_{CT})$, $R_L(i_L)$, $L(i_L)$, and x represents the variables $i_{CT}$, and $i_L$. Using Equations 2-4, the expression of each of the corresponding $A(x)$ parameters can expressed as follows:

$$R_{CT}'(i_{CT}^0) = A_{CT}/(\alpha_{CT} i_{CT}^0) \quad \text{EQ 23}$$

$$R_L'(i_L^0) = A_L/(\alpha_L i_L^0) \quad \text{EQ 24}$$

$$L'(i_L^0) = B_L/(\alpha_L i_L^0) \quad \text{EQ 25}$$

By substitution of Equation 14 for $(\alpha_L \cdot i_L^0)$ and $(\alpha_{CT} \cdot i_{CT}^0)$ in Equations 23-25, the following equations are obtained:

$$R_{CT}'(i_{CT}^0) = R_{CT}'(I^0) = A_{CT}/I^0 \quad \text{EQ 26}$$

$$R_L'(i_L^0) = R_L'(I^0) = A_L/I^0 \quad \text{EQ 27}$$

$$L'(i_L^0) = L'(I^0) = B_L/I^0 \quad \text{EQ 28}$$

While the model has been described in terms of the electrical circuit shown in FIG. 1A, it is noted that the model applies to equivalents of the illustrated circuit. As will be readily understood by one of ordinary skill in the art, this follows from electrical circuit (or electrical network) theory, in that every circuit is typically equivalent to other circuits which perform exactly the same function but have different configurations. For example, as already noted, a single resistor is equivalent to a plurality of appropriately-selected resistors that are connected in parallel or in series.

Figure 1B:
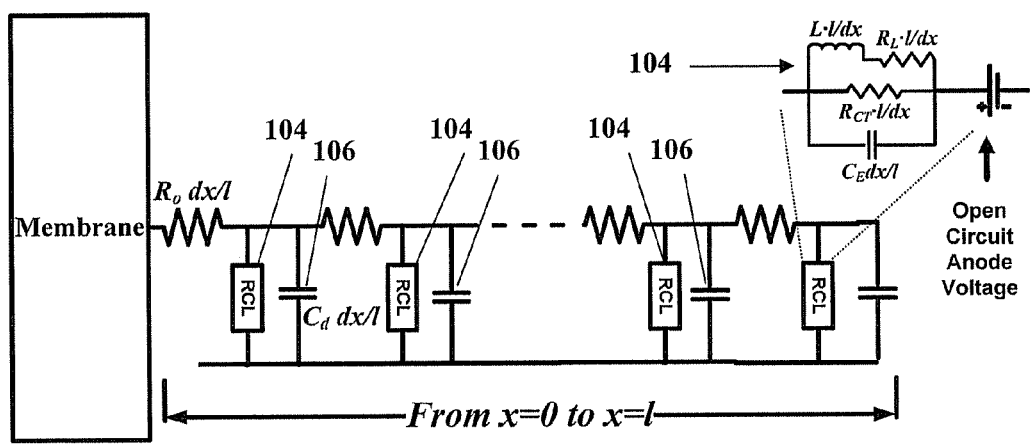

The model also can be extended to a circuit network consisting of a plurality of RCL circuits, such as the exemplary circuit illustrated in FIG. 1B. Illustratively, the exemplary circuit 101 comprises a plurality of RCL circuits 104 and corresponding capacitors 106 in parallel with one another, in a cascade arrangement as shown. According to a transmission line model, for example, a modeled fuel cell can be equivalently described as a transmission line in which the fuel cell is the circuit network of the elements of the activation terms. In a model according to the invention, the activation term is the RCL circuit. Accordingly, the model further includes a circuit network comprising the RCL circuits of the model described herein.

It further follows that in another embodiment, a model provided by the invention can be a circuit network consisting of a plurality of models of the type already described. For a fuel cell stack, the fuel cell stack can be modeled as a group of fuel cells which are each modeled individually using the models of the invention. Accordingly, a model according to the invention also encompasses a circuit network comprising the circuits illustrated in FIGS. 1A and 1B.

Figure 2:
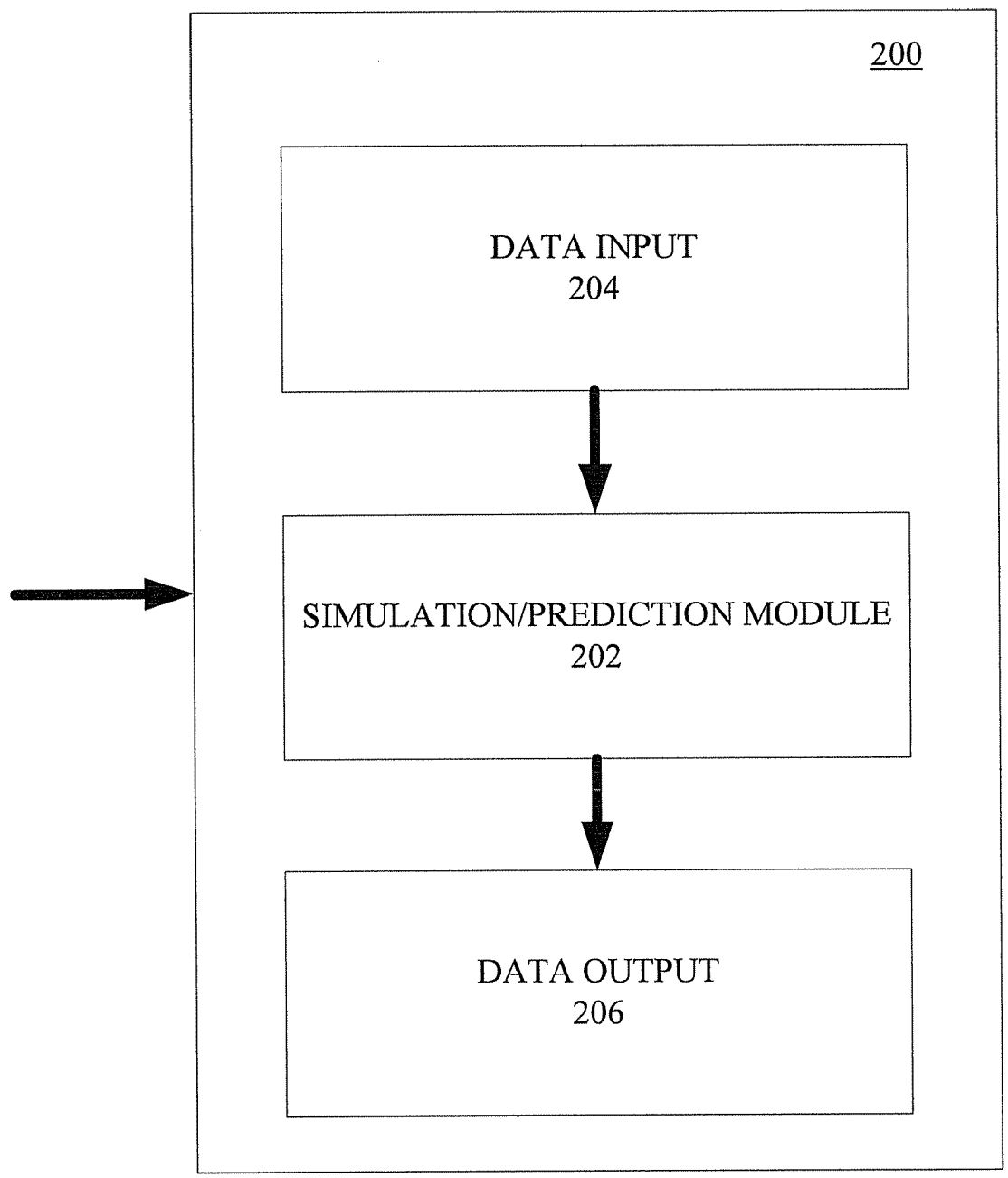
FIG. 2 is a schematic diagram of a system for simulating, predicting, and/or optimizing a fuel cell based upon the nonlinear electrical circuit equivalent of FIG. 1A.

Referring now to FIG. 2, a system 200 incorporating a computation module 202 for simulating or predicting the transient behavior of a fuel cell, according to one embodiment of the invention, is schematically illustrated. The system 200, as described more particularly below, can be part of a design system, a fuel-cell-based power system, or other type of system in which it is advantageous to simulate, predict, and/or optimize a fuel cell.

Illustratively, the system 200 further includes a data input 204 in communication with the computation module 202 and a data output 206, also in communication with the computation module. As will be readily understood by one of ordinary skill in the art, the computation module 202 can be implemented in machine-readable code configured to run on one or more processors (not shown) comprising logic gates and other known processing elements.

Alternatively, the computation module 202 can be implemented in dedicated hardwired circuitry configured to perform the various simulation or prediction functions described herein. According to yet another embodiment, moreover, the computation module 202 can be implemented in a combination of software-based code and hardwired circuitry that cooperatively perform the various operations described herein.

Operatively, the data input 204 receives a plurality of constant parameter values that are determined based upon theoretical or empirical data corresponding to a particular fuel cell whose behavior is simulated or predicted by the computation module 202. The computation module 202 provides simulation or prediction data to the data output 206, the data being based on a nonlinear electrical circuit equivalent of the fuel cell of the type described above using the received parameter values.

The nonlinear electrical circuit equivalent is based upon the NECDFC model already described. Specifically, the nonlinear electrical circuit equivalent utilized by the computation module 202 comprises an ohmic resistance circuit and an RCL circuit corresponding to the above-described equations, particularly Equations 1-10. The RCL circuit includes an inductive circuit element, L, a first resistive circuit element $R_L$ in series with the inductive circuit element, a second resistive circuit element $R_{CT}$ in parallel with the inductive circuit element L and first resistive circuit element $R_L$, and a capacitive circuit element C in parallel with the second resistive circuit element $R_{CT}$. As further described above, the circuit elements are mathematically defined by a first set of equations comprising Equations 2-5, which are, again:

$$R_{CT}(i_{CT}) = A_{CT} \cdot \ln(\alpha_{CT} i_{CT})/(\alpha_{CT} i_{CT}) \quad \text{EQ 2}$$

$$R_L(i_L) = A_L \cdot \ln(\alpha_L i_L)/(\alpha_L i_L) \quad \text{EQ 3}$$

$$L(i_L) = B_L \cdot \ln(\alpha_L i_L)/(\alpha_L i_L) \quad \text{EQ 4}$$

$$C = C_0, \quad \text{EQ 5}$$

where, as already noted, $A_k$, $B_k$, and $\alpha_k$, k=CT, L, are the constant parameters determined based upon impedance spectra of the fuel cell, and where $i_{CT}$, $i_C$, and $i_L$ are currents via charge transfer through the second resistive circuit element $R_{CT}$, the capacitive circuit element C, and the inductive circuit element L, respectively.

Moreover, the nonlinear electrical circuit equivalent provided by the computation module 210 is based upon a second set of equations comprising Equations 6-10, which, as above, are:

$$V = V_0 - R_0 I - V_{RCL}, \qquad \text{EQ 6}$$

$$V_{RCL} = R_{CT}(i_{CT}) \cdot i_{CT}, \qquad \text{EQ 7}$$

$$i_c = \frac{dq_c}{dt} \qquad \text{EQ 8}$$
$$= \frac{d}{dt}(C \cdot V_{RCL})$$
$$= \left[C(V_{RCL}) + V_{RCL} \cdot \frac{\partial C(V_{RCL})}{\partial V_{RCL}}\right] \cdot \left(\frac{dV_{RCL}}{dt}\right),$$

$$V_{RCL} = R_L(i_L) \cdot i_L + \frac{d}{dt}[L(i_L)i_L] \qquad \text{EQ 9}$$
$$= R_L(i_L) \cdot i_L + R_L(i_L) \cdot i_L +$$
$$\left[L(i_L) + i_L \frac{\partial L(i_L)}{\partial i_L}\right]\left(\frac{di_L}{dt}\right),$$

and $$I = i_{CT} + i_c + i_L, \qquad \text{EQ 10}$$

where, again, $V_0$ and $R_0$ are open-circuit voltage and ohmic resistance of the fuel cell, respectively, V and I are voltage and current, respectively, of the fuel cell, $V_{RCL}$ is a voltage drop across the RCL circuit, and $q_c$ is charge stored by the capacitive circuit element C.

In one application, a computation module 202 of the type generally described is incorporated in a design tool for designing electrical circuits having fuel cell components. The computation module simulates, analyzes, or predicts transient behavior of the fuel cell components based upon the NECDFC model. Again, the computation module 202 can be implemented in software-based code instructions and/or dedicated hardwired circuitry. The design tool in which the computation module 202 is incorporated can include a circuit design module for simulating, analyzing, and designing an electrical circuit, wherein the electrical circuit includes at least one fuel cell component. Accordingly, the computation module can analyze, simulate, or design the at least one fuel cell component when the at least one fuel cell component is included in the electrical circuit.

Figure 3:
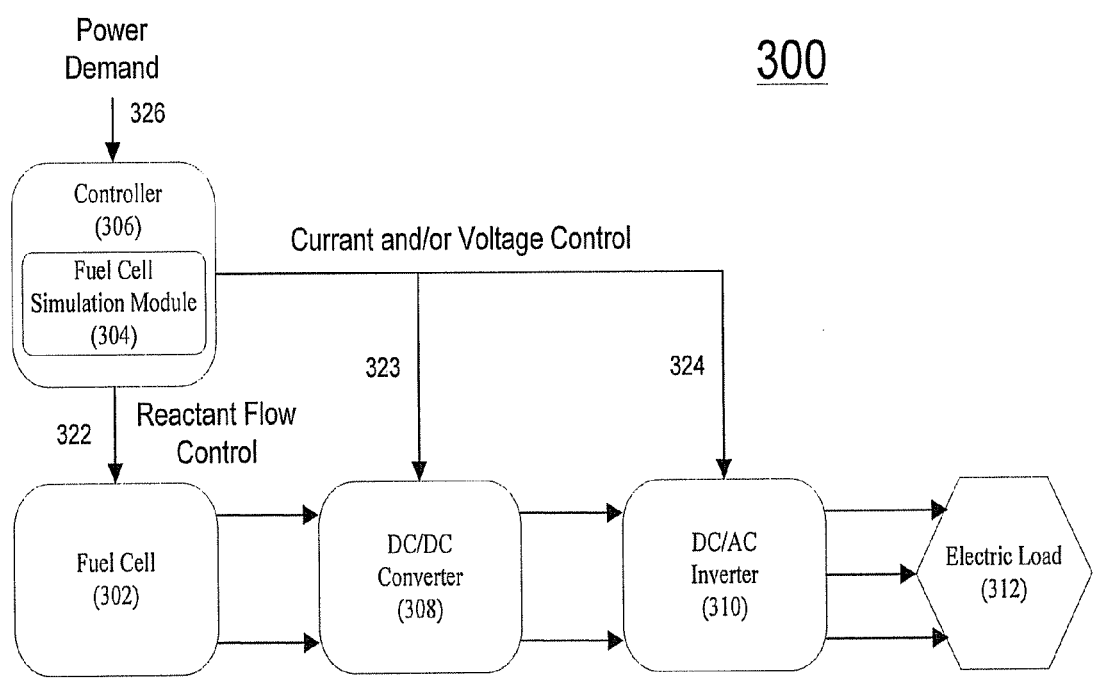
FIG. 3 is a schematic diagram of a fuel cell controller for controlling the operation of a fuel cell based upon the nonlinear electrical circuit equivalent of FIG. 1A.

FIG. 3 schematically illustrates a fuel cell system 300 having a controller for controller a fuel cell, fuel cell stack, and/or a fuel cell power module, according to another embodiment of the invention. The system 300 illustratively includes a fuel cell 302, computation/simulation module 304, and a fuel cell controller 306. In alternative embodiments, the system 300 can alternately include fuel cell stack or fuel cell power module instead of or in addition to the exemplary fuel cell 302 shown in the figure.

The fuel cell controller 306, more particularly, includes the computation/simulation module 304, which as illustrated can be a fuel cell simulation module that connects to the fuel cell 302, a DC/DC converter, and a DC/AC converter through connectors 322, 323 and 324, respectively, for receiving indicator signals from and transmitting control signals to the fuel cell 302. The indicator signals indicate the current operative condition of the fuel cell 302. The fuel cell controller 306 determines whether and, if so, how the operative conditions in the fuel cell should be changed. The fuel cell controller 306, according to the invention, makes these determinations based upon a nonlinear electrical circuit equivalent of the fuel cell, the electrical circuit equivalent corresponding to that of the NECDFC model described above.

In yet another application of the invention, a module similar to the type described in the context of FIG. 2, above, is configured as a fuel cell inverter/converter. The fuel cell inverter/converter illustratively includes at least one connection for connecting the inverter/converter to a fuel cell and an inverter/converter configured to perform inversion/conversion functions. The inverter/converter functions are determined based upon a nonlinear electrical circuit equivalent of the fuel cell, the nonlinear electrical circuit equivalent also corresponding to the NECDFC model described above.

In still another application of the invention, the computation module is a software-based and/or hardware-based module that is utilized to simulate, analyze, or predict the transient behavior of the fuel cell. Based on the module, the dynamic properties of the particular fuel cell or fuel cell stack can be presented by providing the data of the parameters determined as described above on datasheets. The data format can be, for example, a value, value range, a table, a data chart, or a formula from which the parameters of the particular fuel cell, based upon the NECDFC model, can be obtained or derived.

EXAMPLES AND SIMULATION RESULTS

As an example of the operative aspects of the invention, the Membrane and Electrode Assembly (MEA) designated LIM005EA117EC manufactured by Lynntech Industries Ltd. of College Station, Tex., was used in forming and testing an exemplary direct-methanol fuel cell (DMFC), a type of fuel cell in which the fuel is methanol ($CH_3OH$). The MEA is characterized by a 4.0 mg/cm$^2$ PtRu black loading on the anode and a 4.0 mg/cm$^2$ Pt black loading on the cathode. The MEA was inserted between 5 single-cell endplates (LIE005TCHO, Lynntech Industries, Ltd.) and the DMFC was placed in an electric stove set at 60° C. for the duration of the test. A 1 M methanol aqueous solution was used as the fuel at the anode and was cycled by a chemical pump at the rate of 24 ml/min. Air flux at 20 psi, ambient temperature, was injected at the cathode side.

Figure 4:
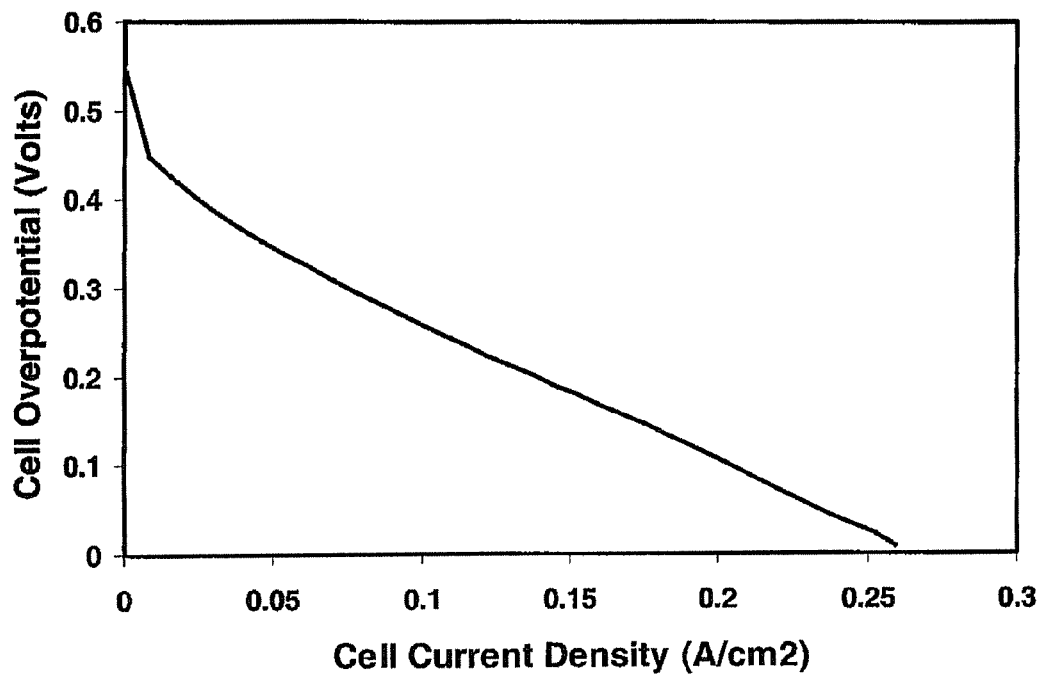
FIG. 4 is an exemplary polarization curve determined in testing certain aspects of the invention, according to another embodiment of the invention.

The polarization curve of the DMFC with commercial MEA was measured by sampling the cell current at the rate 1 mV/s. The experimental results are provided by the polarization curve in FIG. 4, which plots cell overpotential versus cell current density. The curve is linear in the large cell current region. Therefore, the polarization curve can be approximated by the standard electrode equation, Equation 1. By fitting the polarization curve to the standard electrode equation using known curve fitting techniques, the values of the constant parameters $V_0$, $R_0$, and A can be determined as described above. The polarization curves obtained during the experimental process demonstrated a very close fit to the standard electrode equation.

As described above, the parameter A can be obtained by fitting the polarization curve. A, in turn, can be used to determine the constant parameters $A_{CT}$ and $A_L$ in accordance with Equations 12 and 13, above. The constant parameter $R_0$ corresponds to the total cell ohmic resistance and, in the context of the nonlinear dynamic electrical circuit model, the parameter is equal to the first circuit 210 of the model, the equivalent resistance being the sum of the resistive elements in series with one another.

Figure 5:
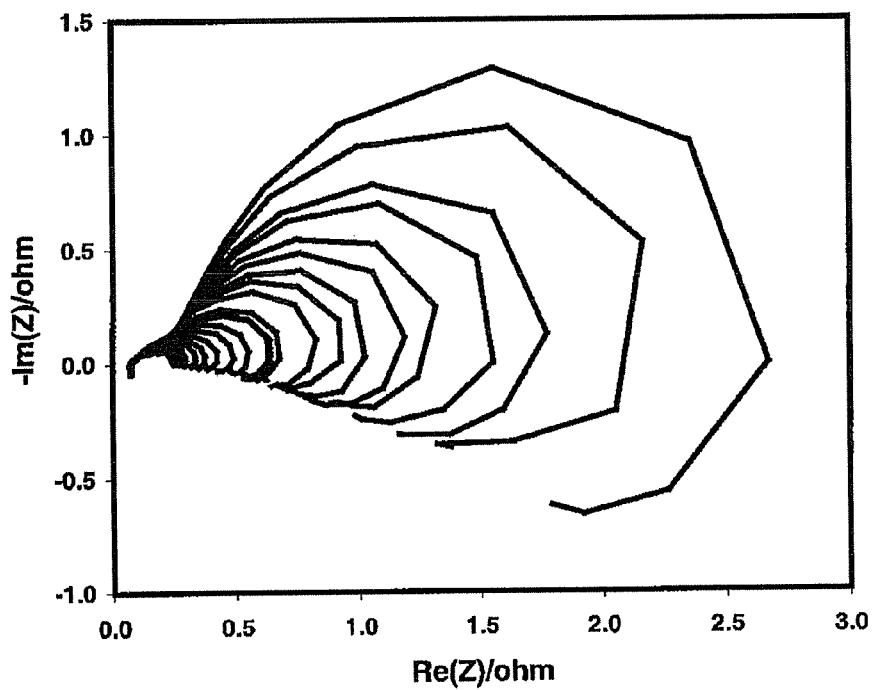
FIG. 5 is a series of plots of exemplary electrochemical impedance spectra determined in testing certain aspects of the invention, according to still another embodiment of the invention.

Electrochemical impedance spectroscopy measurements were obtained for various bias cell-voltages, ranging from 0.1 V to 0.5 V, along the polarization curve of the DMFC from 0.01 Hz to 20 kHz of the frequency range at 10 steps per logarithmic decade. The applied potential alternating amplitude $V_m$ was found to be between 5 mV to 10 mV for the entire set of measurements. Plots of the electrochemical spectra are shown in FIG. 5. As shown, the electrochemical spectra exhibit similar points of sharp nonlinearity intermittent in regions of linearity, and the curves vary smoothly with the change in the bias of the cell voltage or current. The linearized model circuit was used to simulate the impedance spectra and then the values of the corresponding electrical elements were obtained from the simulation results.

Figure 6:
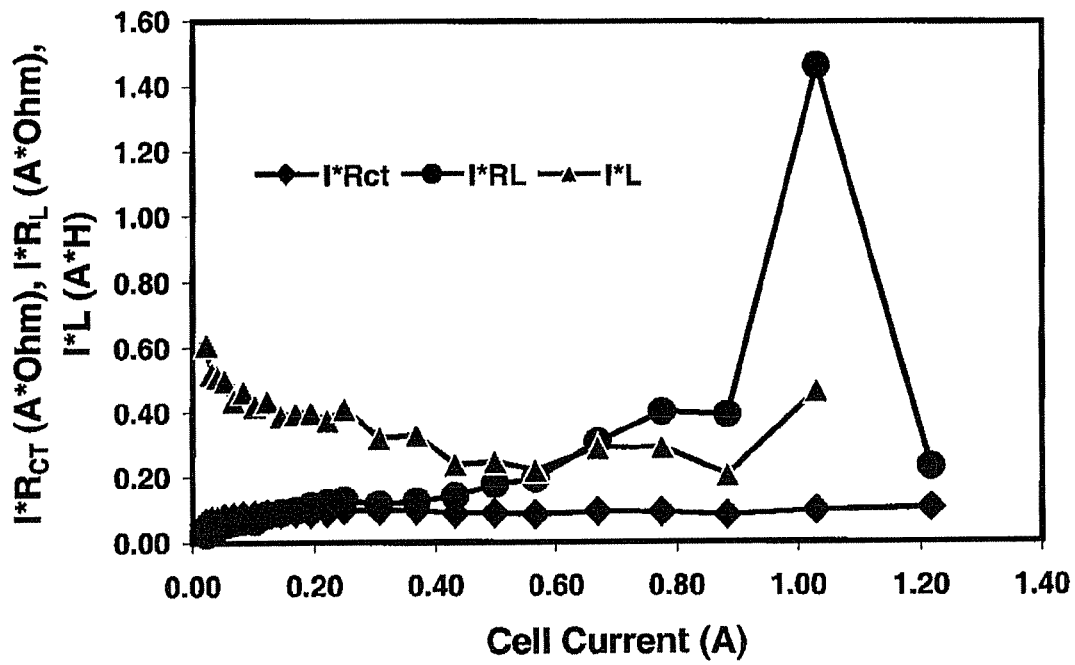
FIG. 6 is a series of plot of representative parameter values versus bias cell current determined based on curve fitting of electrochemical impedance spectra, according to yet another embodiment of the invention.

In the context of the above description of the corresponding equations, note that the values of the electric elements obtained from the impedance spectra relate to the pseudo elements of Equations 26-28. The parameters $A_{CT}$, $A_L$, and B can be obtained by fitting the experimentally obtained data to Equations 26-28. The parameters $\alpha_L$, $\alpha_{CT}$, and A can be derived from the results of the curve fitting and in accordance with Equations 15, 16, and 13, respectively. The values of the parameters so obtained are shown in FIG. 6, in which the parameter values are plotted versus cell current.

Figure 7:
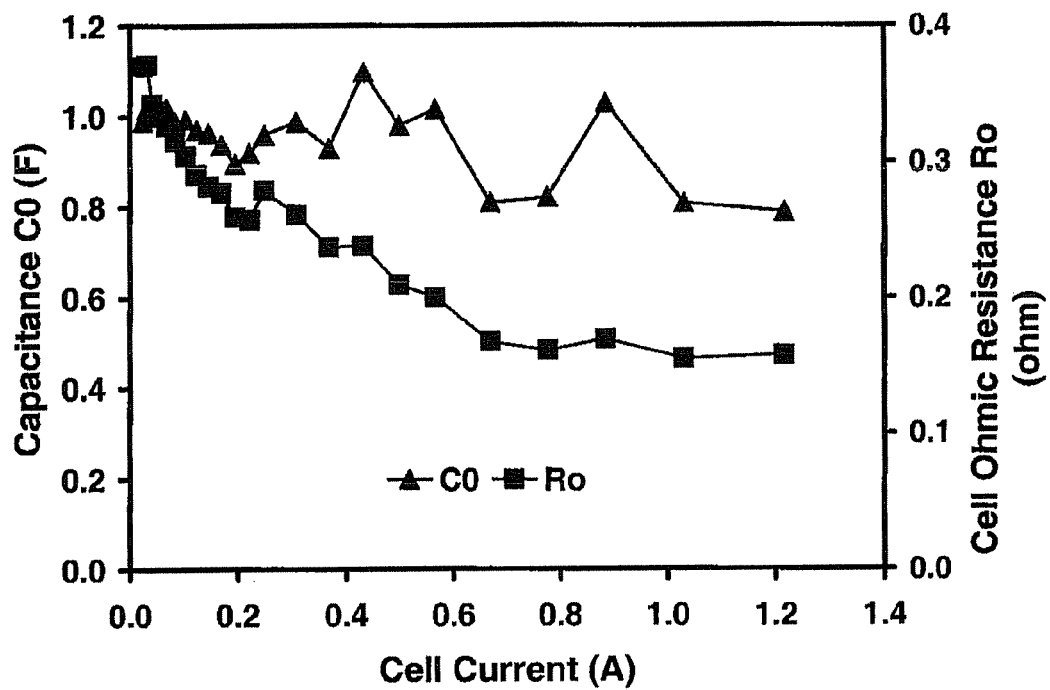
FIG. 7 is a pair of curves plotting capacitance and cell ohmic resistance versus cell current in an exemplary fuel cell, determined according to another embodiment of the invention.

The cell ohmic resistance and the capacitance of the equivalent capacitor in the RCL circuit can also be derived by fitting the impedance spectra to the nonlinear electrical circuit dynamic fuel cell model. The results are shown by the curves in FIG. 7. Note that in many instances all of the parameters in the nonlinear electrical circuit dynamical fuel cell model can be derived from the impedance spectra of the fuel cell.

Figure 8:
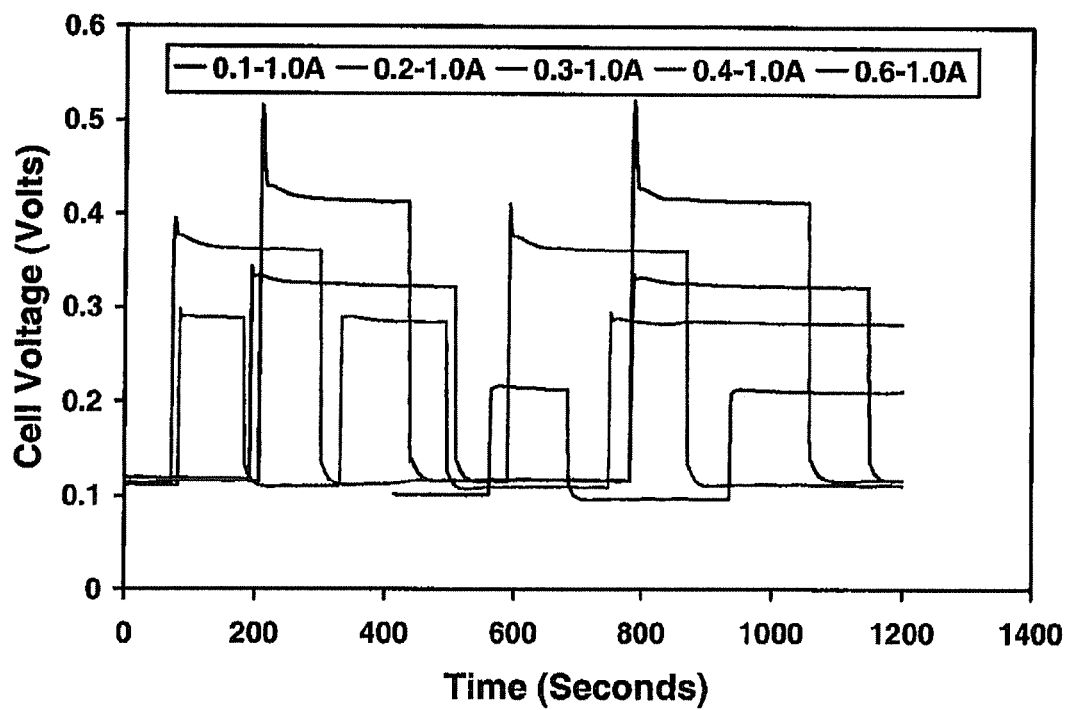
FIG. 8 is a plot of cell voltage versus time based on a simulation of transient behavior of an exemplary fuel cell, determined according to still another embodiment of the invention.

To obtain the simulation results in the experiment, measurements of the transient behavior of the exemplary fuel cell were obtained using a programmable DC electronic load to effect step changes in the cell current. The cell current was switched from 1 A to a lower cell current level; for example, 0.1 A, 0.2 A, 0.3 A, 0.4 A, or 0.6 A. The relative cell voltage response of the DMFC was recorded using a SI-1280B Solartron Electrochemical Workstation, made by Solartron of Hampshire, England. The experimentally determined transient behaviors of the DMFC are shown in FIG. 8.

Numerical simulation was effected based upon the nonlinear electrical circuit dynamical fuel cell model already described. The constant parameters of the nonlinear electrical circuit dynamic fuel cell model, determined using the various techniques described are given in Table 1, immediately below.

Figure 9:
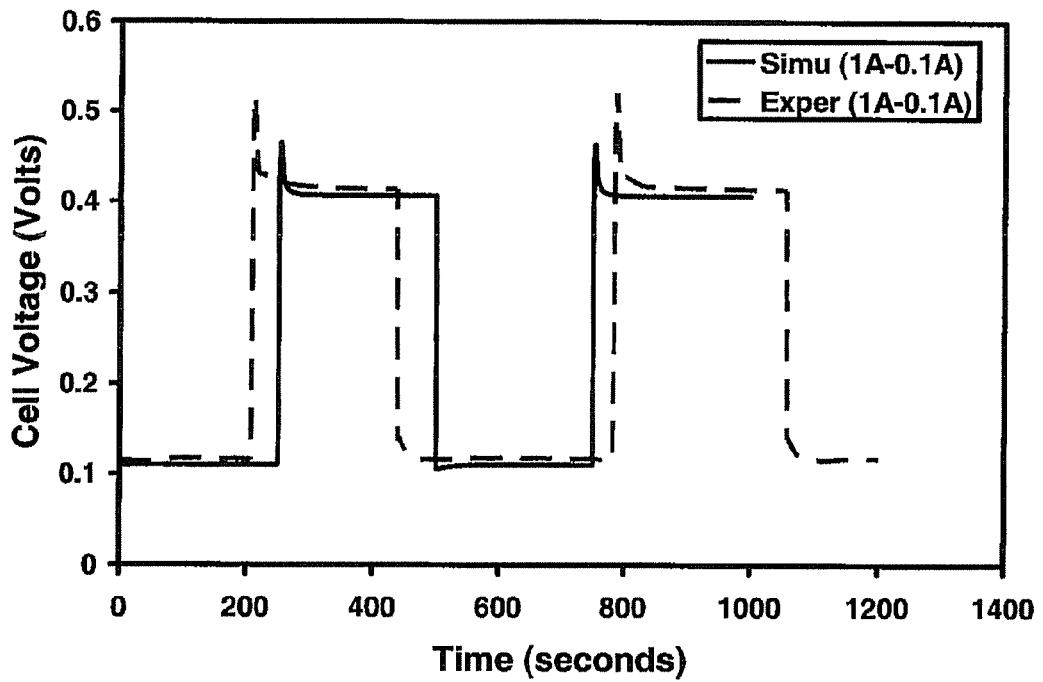
FIG. 9 is a plot of voltage versus time derived from the simulation of a direct-methanol fuel cell (DMFC), determined according to yet another embodiment of the invention.
Figure 10A:
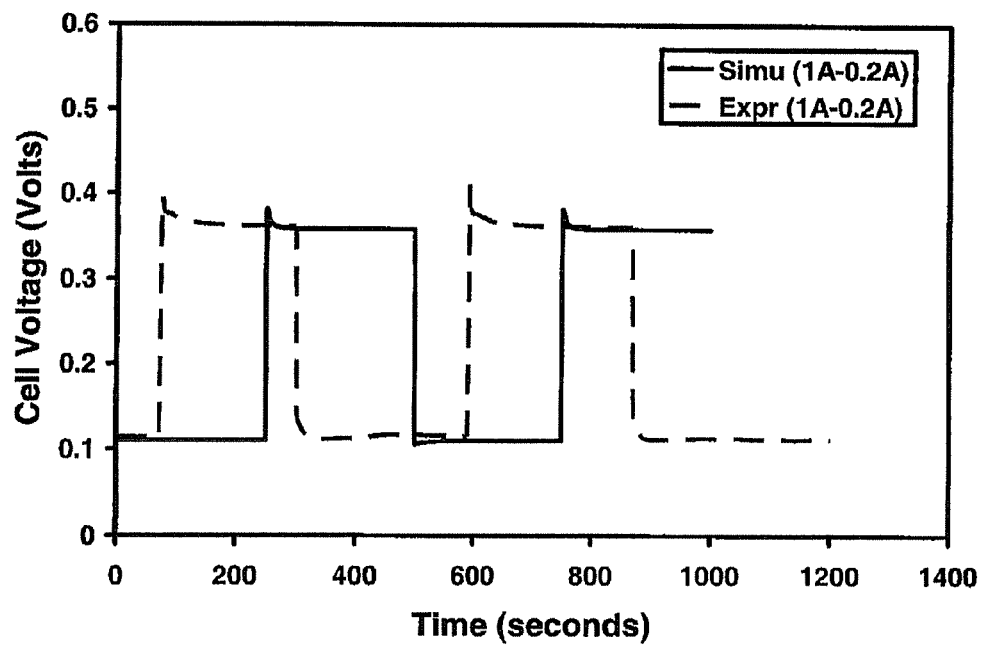
FIGS. 10A-D are a series of plots of voltage versus time derived according to other embodiments of the invention.
Figure 10B:
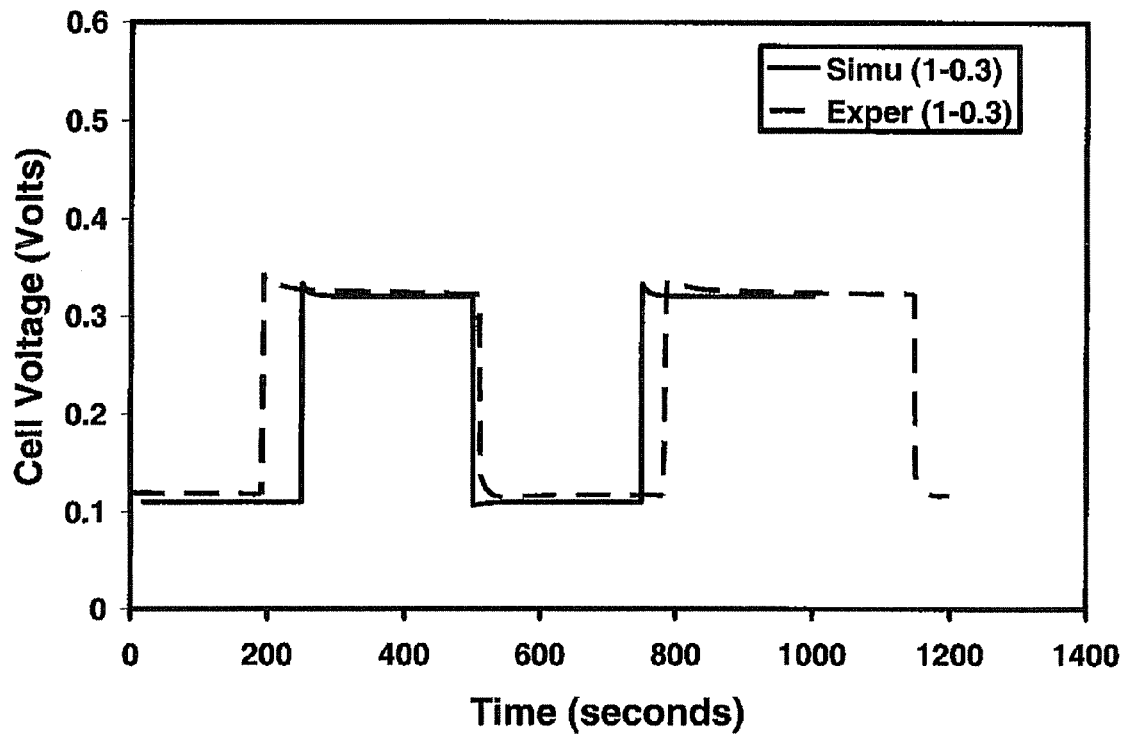
Figure 10C:
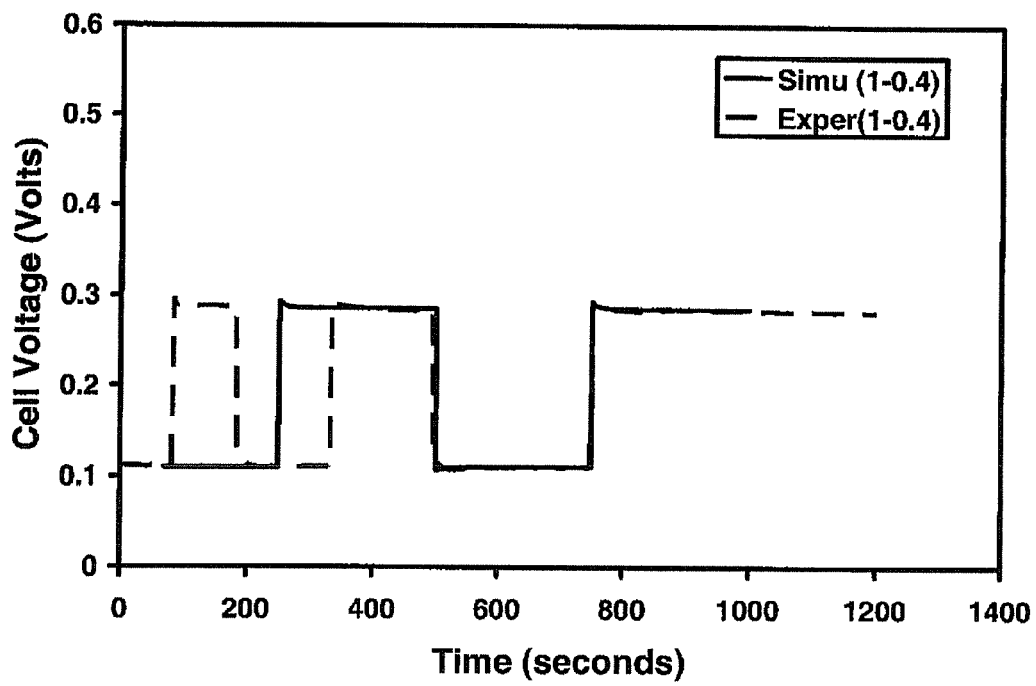
Figure 10D:
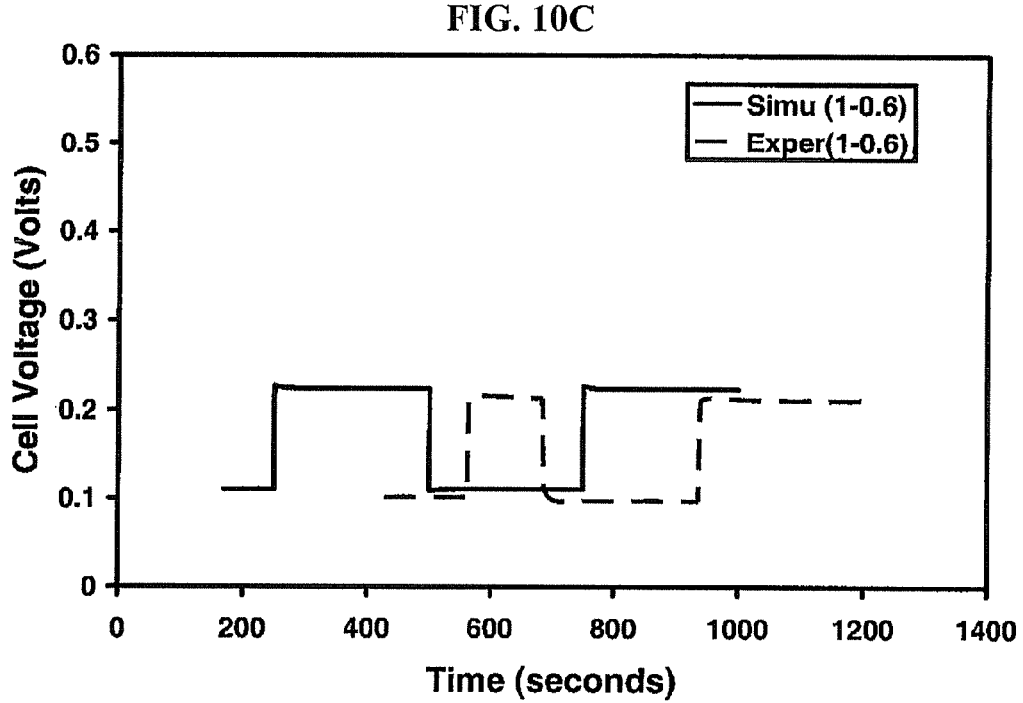

The numerical simulation results of the DMFC driven by square-pulse currents are shown in FIG. 9. The results are contrasted with the experimental results obtained for the fuel cell, which are shown for different current levels in FIGS. 10A-10D.

The invention can be realized in hardware, software, or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: (a) conversion to another language, code or notation; and (b) reproduction in a different material form.

This invention can be embodied in other forms without departing from the spirit or essential attributes thereof. Accordingly, reference should be made to the following claims, rather than to the foregoing specification, as indicating the scope of the invention.

We claim:

1. A system for simulating and predicting optimizing transient behavior of a fuel cell, the system comprising:

a data input for receiving a plurality of constant parameter values determined based upon theoretical or experimental data corresponding to the fuel cell; and a computation module in communication with the data input for providing a nonlinear electrical circuit equivalent of the fuel cell, the nonlinear electrical circuit equivalent comprising an ohmic resistance circuit and an RCL circuit, the RCL circuit including an inductive circuit element, L, a first resistive circuit element $R_L$ in series with the inductive circuit element, a second resistive circuit element $R_{CT}$ in parallel with the inductive circuit element L and first resistive circuit element $R_L$, and a capacitive circuit element C in parallel with the second resistive circuit element $R_{CT}$;

wherein the computation module is implemented in dedicated hardwired circuitry,

TABLE 1

| Data Type | | Ro(Ω) | A | AL | Act | C(F) | B'L | V0(V) |
|---|---|---|---|---|---|---|---|---|
| Experiment | I-V curve | 0.236-0.244 | 0.027-0.030 | / | / | / | / | 0.37-0.40 |
| | EIS | 0.16-0.4 | (0.02-0.09) | 0.026-0.4 | 0.066-0.10 | 0.8-1.1 | 0.6-0.2 | / |
| Simulation | | 0.24 | 0.03 | 0.05 | 0.075 | 0.95 | 0.6 | 0.37 |

Parameters of the Dynamic Model wherein the circuit elements are mathematically defined by a first set of equations comprising $$R_{CT}(i_{CT}) = A_{CT} \cdot \ln(\alpha_{CT} i_{CT})/(\alpha CT \cdot i_{CT})$$

$$R_L(i_L) = A_L \cdot \ln(\alpha_L i_L)/(\alpha_L i_L)$$

$$L(i_L) = B_L \cdot \ln(\alpha_L i_L)/(\alpha_L i_L)$$

$$C = C_0$$

where $A_k$, $B_k$, and $\alpha_k$, k=CT, L, are the constant parameters determined based upon impedance spectra of the fuel cell, and where $i_{CT}$, $i_c$, and $i_L$ are currents via charge transfer through the second resistive circuit element $R_{CT}$, the capacitive circuit element C, and the inductive circuit element L, respectively;

wherein the nonlinear electrical circuit based upon a set of equations comprising $$V = V_0 - R_0 I - V_{RCL},$$

$$V_{RCL} = R_{CT}(i_{CT}) \cdot i_{CT},$$

$$i_c = \frac{dq_c}{dt}$$
$$= \frac{d}{dt}(C \cdot V_{RCL})$$
$$= C \cdot \left(\frac{dV_{RCL}}{dt}\right),$$

$$V_{RCL} = R_L(i_L) \cdot i_L + \frac{d}{dt}[L(i_L) i_L]$$
$$= R_L(i_L) \cdot i_L + R_L(i_L) \cdot i_L +$$
$$\left[L(i_L) + i_L \frac{\partial L(i_L)}{\partial i_L}\right]\left(\frac{di_L}{dt}\right),$$

and $$I = i_{CT} + i_c + i_L,$$

where $V_0$ and $R_0$ are open-circuit voltage and ohmic resistance of the fuel cell, respectively, V and I are voltage and current, respectively, of the fuel cell, $V_{RCL}$, is a voltage drop across the RCL circuit, and $q_c$ is charge stored by the capacitive circuit element C.

2. The system of claim 1, wherein at least one of the constant parameters is derived from a polarization curve of the fuel cell.

3. The system of claim 1, wherein at least one of the constant parameters is derived from electrochemical impedance spectra corresponding to the fuel cell.

4. A design tool for designing electrical circuits having fuel cell components, the design tool comprising:
a circuit design module for analyzing and designing an electrical circuit, wherein the electrical circuit includes at least one fuel cell component; and
a fuel cell design module for analyzing and designing the at least one fuel cell component when the at least one fuel cell component is included in the electrical circuit;
wherein the fuel cell design module is implemented in dedicated hardwired circuitry;
wherein the fuel cell design module is configured to analyze and design the at least one fuel cell component based upon a nonlinear electrical circuit equivalent of the at least one fuel cell, the nonlinear electrical circuit equivalent comprising an ohmic resistance circuit and an RCL circuit, the RCL circuit including an inductive circuit element, L, a first resistive circuit element RL in series with the inductive circuit element, a second resistive circuit element $R_{CT}$ in parallel with the inductive circuit element L and first resistive circuit element $R_L$, and a capacitive circuit element C in parallel with the second resistive circuit element $R_{CT}$;

wherein the circuit elements are mathematically defined by a first set of equations comprising $$R_{CT}(i_{CT}) = A_{CT} \cdot \ln(\alpha_{ct} i_{CT})/(\alpha_{CT} i_{CT})$$

$$R_L(i_L) = A_L \cdot \ln(\alpha_L i_L)/(\alpha_L i_L)$$

$$L(i_L) = B_L \cdot \ln(\alpha_L i_L)/(\alpha_L i_L)$$

$$C = C_0$$

where $A_k$, $B_k$, and $\alpha_k$, k=CT, L, are the constant parameters determined based upon impedance spectra of the fuel cell, and where $i_{CT}$, $i_c$, and $i_L$ are currents via charge transfer through the second resistive circuit element $R_{CT}$, the capacitive circuit element C, and the inductive circuit element L, respectively;

wherein the nonlinear electrical circuit is based upon a set of equations comprising $$V = V_0 - R_0 I - V_{RCL},$$

$$V_{RCL} = R_{CT}(i_{CT}) \cdot i_{CT},$$

$$i_c = \frac{dq_c}{dt}$$
$$= \frac{d}{dt}(C \cdot V_{RCL})$$
$$= C \cdot \left(\frac{dV_{RCL}}{dt}\right),$$

$$V_{RCL} = R_L(i_L) \cdot i_L + \frac{d}{dt}[L(i_L) i_L]$$
$$= R_L(i_L) \cdot i_L + R_L(i_L) \cdot i_L +$$
$$\left[L(i_L) + i_L \frac{\partial L(i_L)}{\partial i_L}\right]\left(\frac{di_L}{dt}\right),$$

and $$I = i_{CT} + i_c + i_L,$$

where $V_0$ and $R_0$ are open-circuit voltage and ohmic resistance of the fuel cell, respectively, V and I are voltage and current, respectively, of the fuel cell, $V_{RCL}$ is a voltage drop across the RCL circuit, and $q_c$ is charge stored by the capacitive circuit element C.

5. The design tool of claim 4, wherein at least one of the constant parameters is derived from a polarization curve of the fuel cell.

6. The design tool of claim 4, wherein at least one of the constant parameters is derived from electrochemical impedance spectra corresponding to the fuel cell.

7. A controlled fuel cell system comprising:
a fuel cell; and
a fuel cell controller having a signal input for receiving signals indicating an operative condition of the fuel cell and having a signal output for transmitting control signals to the fuel cell to effect a change in the operative condition of the fuel cell;
wherein the fuel cell controller is configured to control operative conditions in the fuel cell based upon a nonlinear electrical circuit equivalent of the fuel cell, the nonlinear electrical circuit equivalent comprising an ohmic resistance circuit and an RCL circuit, the RCL circuit including an inductive circuit element, L, a first resistive circuit element $R_L$ in series with the inductive circuit element, a second resistive circuit element $R_{CT}$ in parallel with the inductive circuit element L and first resistive circuit element $R_L$, and a capacitive circuit element C in parallel with the second resistive circuit element $R_{CT}$;

wherein the circuit elements are mathematically defined by a first set of equations comprising $$R_{CT}(i_{CT}) = A_{CT} \cdot \ln(\alpha_{ct} \cdot i_{CT})/(\alpha_{CT} \cdot i_{CT})$$

$$R_L(i_L) = A_L \cdot \ln(\alpha_L \cdot i_L)/(\alpha_L \cdot i_L)$$

$$L(i_L) = B_L \cdot \ln(\alpha_L \cdot i_L)/(\alpha_L \cdot i_L)$$

$$C = C_0$$

where $A_k$, $B_k$, and $\alpha_k$, k=CT, L, are the constant parameters determined based upon impedance spectra of the fuel cell, and where $i_{CT}$, $i_c$, and $i_L$ are currents via charge transfer through the second resistive circuit element $R_{CT}$, the capacitive circuit element C, and the inductive circuit element L, respectively;

wherein the nonlinear electrical circuit is based upon a set of equations comprising $$V = V_0 - R_0 I - V_{RCL},$$

$$V_{RCL} = R_{CT}(i_{CT}) \cdot i_{CT},$$

$$i_c = \frac{dq_c}{dt}$$
$$= \frac{d}{dt}(C \cdot V_{RCL})$$
$$= C \cdot \left(\frac{dV_{RCL}}{dt}\right),$$

$$V_{RCL} = R_L(i_L) \cdot i_L + \frac{d}{dt}[L(i_L) i_L]$$
$$= R_L(i_L) \cdot i_L + R_L(i_L) \cdot i_L +$$
$$\left[L(i_L) + i_L \frac{\partial L(i_L)}{\partial i_L}\right]\left(\frac{di_L}{dt}\right),$$

and $$I = i_{CT} + i_c + i_L,$$

where $V_0$ and $R_0$ are open-circuit voltage and ohmic resistance of the fuel cell, respectively, V and/are voltage and current, respectively, of the fuel cell, $V_{RCL}$ is a voltage drop across the RCL circuit, and $q_c$ is charge stored by the capacitive circuit element C.

8. A fuel cell controller for power inverter/converter comprising:

at least one connection for connecting the inverter/converter to a fuel cell;

an inverter/converter configured to perform inversion/conversion functions based upon a nonlinear electrical circuit equivalent of the fuel cell, the nonlinear electrical circuit equivalent comprising an ohmic resistance circuit and an RCL circuit, the RCL circuit including an inductive circuit element, L, a first resistive circuit element $R_L$ in series with the inductive circuit element, a second resistive circuit element $R_{CT}$ in parallel with the inductive circuit element L and first resistive circuit element $R_L$, and a capacitive circuit element C in parallel with the second resistive circuit element $R_{CT}$;

wherein the circuit elements are mathematically defined by a first set of equations comprising $$R_{CT}(i_{CT}) = A_{CT} \cdot \ln(\alpha_{ct} \cdot i_{CT})/(\alpha_{CT} \cdot i_{CT})$$

$$R_L(i_L) = A_L \cdot \ln(\alpha_L \cdot i_L)/(\alpha_L \cdot i_L)$$

$$L(i_L) = B_L \cdot \ln(\alpha_L \cdot i_L)/(\alpha_L \cdot i_L)$$

$$C = C_0$$

where $A_k$, $B_k$, and $\alpha_k$, k=CT, L, are the constant parameters determined based upon impedance spectra of the fuel cell, and where $i_{CT}$, $i_c$, and $i_L$ are currents via charge transfer through the second resistive circuit element $R_{CT}$, the capacitive circuit element C, and the inductive circuit element L, respectively;

wherein the nonlinear electrical circuit is based upon a set of equations comprising $$V = V_0 - R_0 I - V_{RCL},$$

$$V_{RCL} = R_{CT}(i_{CT}) \cdot i_{CT},$$

$$i_c = \frac{dq_c}{dt}$$
$$= \frac{d}{dt}(C \cdot V_{RCL})$$
$$= C \cdot \left(\frac{dV_{RCL}}{dt}\right),$$

$$V_{RCL} = R_L(i_L) \cdot i_L + \frac{d}{dt}[L(i_L) i_L]$$
$$= R_L(i_L) \cdot i_L + R_L(i_L) \cdot i_L +$$
$$\left[L(i_L) + i_L \frac{\partial L(i_L)}{\partial i_L}\right]\left(\frac{di_L}{dt}\right),$$

and $$I = i_{CT} + i_c + i_L,$$

where $V_0$ and $R_0$ are open-circuit voltage and ohmic resistance of the fuel cell, respectively, V and I are voltage and current, respectively, of the fuel cell, $V_{RCL}$ is a voltage drop across the RCL circuit, and $q_c$ is charge stored by the capacitive circuit element C.

* * * * *

UNITED STATES PATENT AND TRADEMARK OFFICE
CERTIFICATE OF CORRECTION

| | | |
|---|---|---|
| PATENT NO. | : 7,844,434 B2 | Page 1 of 1 |
| APPLICATION NO. | : 11/761077 | |
| DATED | : November 30, 2010 | |
| INVENTOR(S) | : Yang Wang and Jian-ping Zheng | |

It is certified that error appears in the above-identified patent and that said Letters Patent is hereby corrected as shown below:

Column 13, line 67, replace the uppercase L with a subscript L in "a first resistive circuit element RL" so it reads: a first resistive circuit element $R_L$ Signed and Sealed this
Third Day of May, 2011

David J. Kappos
*Director of the United States Patent and Trademark Office*